Patented Dec. 23, 1930

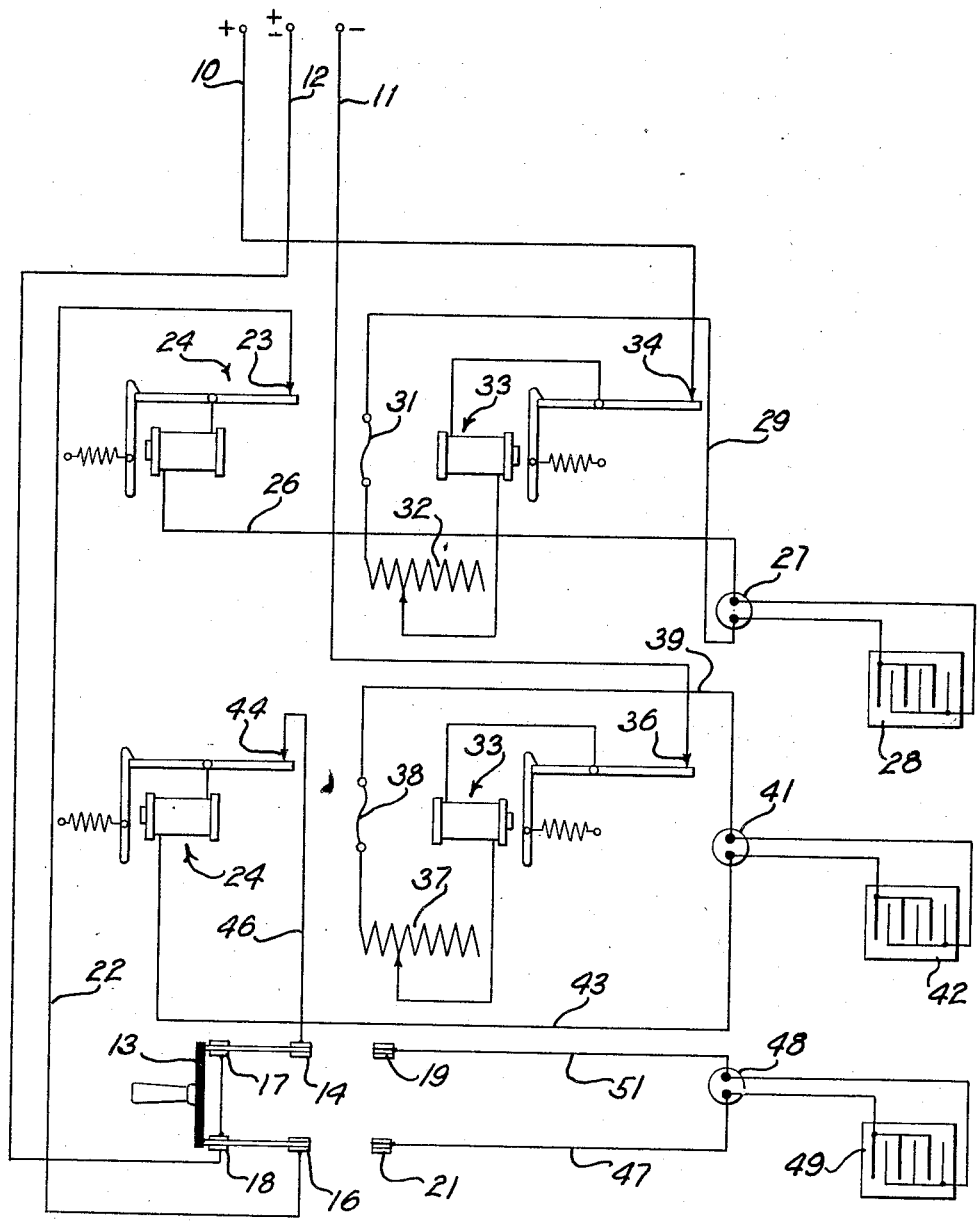

1,785,086

UNITED STATES PATENT OFFICE

AMOS DURBIN PRITCHARD, OF CHICAGO, ILLINOIS, ASSIGNOR TO WESTERN ELECTRIC COMPANY, INCORPORATED, OF NEW YORK, N. Y., A CORPORATION OF NEW YORK

SYSTEM FOR CHARGING STORAGE BATTERIES

Application filed November 19, 1928. Serial No. 320,323.

This invention relates to a system for charging storage batteries and more particularly to a system for charging batteries of the type used in electric trucks.

In charging storage batteries, particularly those used for driving electrical trucks, it has heretofore been the practice, in some instances, to connect a number of batteries in parallel across mains leading to a source of electrical energy of a higher voltage than the charging requirements of the individual batteries. For instance, a 70 volt battery has sometimes been connected across 115 volt mains leading from a direct current supply source, thus necessitating the inclusion of a considerable amount of resistance in series therewith in order to reduce the line voltage to the charging requirement of the battery.

The primary object of this invention is to provide a simple, efficient and flexible system for charging storage batteries with minimum current losses.

The invention contemplates the provision of a double pole double throw switch in a 230 volt three-wire direct current circuit consisting of negative, neutral and positive mains. In one position the switch connects one storage battery across the positive and neutral mains and a second storage battery across the neutral and negative mains; while in its other position the switch connects three storage batteries in series across the positive and negative mains for charging them simultaneously.

A more complete understanding of the invention will be secured from the following detailed description when considered in connection with the accompanying drawing, in which The figure is a circuit diagram of a battery charging system embodying the features of the invention.

Referring to the drawing, a three-wire circuit is shown comprising a positive main 10, a negative main 11 and a neutral main 12 which may be connected to any suitable source of direct current (not shown). A three-wire circuit capable of carrying 230 volts D. C. is used, the voltage between each of the mains and the neutral being 115 volts.

A double pole double throw switch 13, mounted on poles 14 and 16 is shown so located that when thrown to the left, it engages terminals 17 and 18, and when thrown to the right, it engages terminals 19 and 21.

By means of the conductor 22 extending from the pole 16, a contact 23 of an underload circuit breaker, generally denoted by the numeral 24, is connected with the switch 13. The underload circuit breaker 24 is connected by a conductor 26 with one terminal of a connector or charging receptacle 27 to which a battery 28 is shown connected by suitable cords which are detachable from the battery when it is desired that electrical connection therewith be broken. A conductor 29 leads from the other side of the connector 27 to a fuse 31, a rheostat 32 and an overload circuit breaker, generally denoted by the numeral 33, which are placed in series in the circuit. A contact 34 of the overload circuit breaker 33 is connected with the main 10. The main 11 is connected to a contact 36 of an overload circuit breaker 33, which is connected in series with a rheostat 37 and a fuse 38, the latter being connected by conductor 39 with a connector 41 shown connected to a battery 42. A conductor 43 leads from the connector 41 to an underload circuit breaker 24, a contact 44 of which is connected by a conductor 46 to the pole 14 of the switch. The terminal 21 is connected by a conductor 47 to a connector 48 shown connected to a battery 49. A conductor 51 leads from the connector 48 to terminal 19 of the switch 13.

When the switch 13 is thrown to the left, as shown in full lines in the drawing, two separate circuits are established, the first of which may be traced as follows: from main 10, through contact 34, circuit breaker 33, rheostat 32, fuse 31 and conductor 29 to the connector 27 and associated battery 28. From the connector 27 the current passes through the conductor 26, underload circuit breaker 24, contact 23, conductor 22, switch post 16, and switch terminal 18 to main 12. The second circuit may be traced from the main 12, through switch terminal 18, across to switch terminal 17, through switch post 14, conductor 46, contact 44, underload circuit breaker 24, and conductor 43 to the connector 41 and associated battery 42. From the connector 41 the current passes through the conductor 39, fuse 38, rheostat 37, overload circuit breaker 33, and contact 36 to main 11.

When the switch is thrown to the right a third circuit is established which may be traced as follows: from the main 10, through contact 34, circuit breaker 33, rheostat 32, fuse 31, conductor 29, connector 27 and associated battery 28, conductor 26, underload circuit breaker 24, contact 23, conductor 22, switch post 16, switch 13, switch terminal 21, conductor 47, connector 48, and associated battery 49, conductor 51, switch terminal 19, switch 13, switch post 14, conductor 46, contact 44, underload circuit breaker 24, conductor 43, connector 41 and associated battery 42, conductor 39, fuse 38, rheostat 37, overload circuit breaker 33, and through the contact 36 thereof to main 11.

From the foregoing it will be observed that when the switch 13 is in an open position, none of the batteries are in circuit with any of the sources of current supply. However, when the switch is thrown to the left, it will be obvious that the battery attached to the connector 27 may be charged, the necessary power being brought from the 115 volt main 10 through switch post 16 and switch terminal 18 and out through the main 12. With the switch in this position a second battery 42 associated with the connector 41 may also be charged, the charging current being conducted in this case from the main 11, through the rheostat 37, the connector 41, through the switch post 14 and the switch terminals 17 and 18 to the main 12. When the switch is closed in this manner each of the batteries are respectively in series with rheostats which are used to adjust the voltage from the 115 volt supply to the 70 volt charging requirement of each battery. When it is desired to charge three batteries the switch is thrown to the right and the charging current is secured from the main 10 through the resistance 32, battery 28, the switch post 16 and switch terminal 21 to battery 49, from which the current passes through switch terminal 19, switch post 14, battery 42, and resistance 37 to the main 11. Since the voltage across the mains 10 and 11 is 230 volts and since the combined charging requirement for the three batteries is 210 volts, it will be observed that each of the resistances in series with the batteries 28 and 42 will be required to take up a surplus of only 10 volts each. Where three batteries require charging, the system enables an efficient distribution of current so that only 20 volts of the 230 volt supply need be consumed in the resistance, whereas, heretofore, in charging two batteries connected across 115 volt mains, it has been necessary to employ a resistance in series with each battery to reduce the voltage from the 115 volt load of the mains to the 70 volt charging requirement of each battery, which results in a total loss of 90 volts in charging two batteries.

The system described above, which permits the charging of three batteries simultaneously in series, may also be utilized for the charging of two batteries or a single battery without other rearrangement of the apparatus than the throwing of the switch 13. No difficulty should be experienced in adjusting the system for selectively charging one or a group of batteries, since rheostats 32 and 37 are provided for the convenient adjustment of charging current values to meet the changed conditions incident to a variation of the number of batteries to be charged. The switch 13 selectively establishes the various circuits employed in the system and any competent workman familiar with the operation of the conventional storage battery charging system may suitably adjust the resistances in accordance with the circuit established by the throwing of the switch. When it is desired to charge a single battery, the battery may be associated with either of the connectors 27 or 41 and the rheostat in series therewith adjusted to take up the surplus voltage in that particular circuit.

The above described system, in affording a flexibility of control, whereby the operator may regulate the charging of either one, two or three batteries by the manipulation of a single switch, enables an appreciable saving in equipment and labor costs.

It should be understood that the system described is susceptible of a wide variation in the disposal of its parts without departing from the spirit and scope of the invention as defined in the appended claims.

What is claimed is:

1. In a system for charging storage batteries, a three-wire direct current circuit including positive, neutral and negative mains, a plurality of battery connectors arranged therein, and selectively operable means for connecting one of the battery connectors between the neutral and one of the other mains or a plurality of the connectors in series between the positive and negative mains.

2. In a system for charging storage batteries, a three-wire direct current circuit including positive, neutral and negative mains, a plurality of battery connectors arranged therein, and a double pole double throw switch for selectively connecting a battery connector between the neutral and one of the other mains, or all of the connectors in series between the positive and negative mains.

3. In a system for charging storage batteries, a three-wire direct current circuit including positive, negative and neutral mains, a plurality of connectors associated therewith for accommodating batteries to be charged, and common means for interconnecting the connectors in series across the positive and negative mains and for connecting one of the connectors across the positive and neutral mains and another of the connectors across the negative and neutral mains.

4. In a system for charging storage batteries, a three-wire direct current circuit including positive, negative and neutral mains, a plurality of receptacles associated therewith for accommodating batteries to be charged, and a double pole double throw switch associated with the mains so that when in one position, the receptacles are connected in series across the positive and negative mains, and when in another position, one of the receptacles is connected across the positive and neutral mains and another of the receptacles is connected across the negative and neutral mains.

In witness whereof, I hereunto subscribe my name this 8 day of November A. D. 1928.

AMOS DURBIN PRITCHARD.